Jan. 12, 1932.  S. G. AVERELL  1,840,347
SPRING SCALE
Filed June 6, 1929   2 Sheets-Sheet 1

INVENTOR
Sylvester G. Averell,
BY
Henry M. Bingham
his  ATTORNEY

Jan. 12, 1932.  S. G. AVERELL  1,840,347
SPRING SCALE
Filed June 6, 1929  2 Sheets-Sheet 2
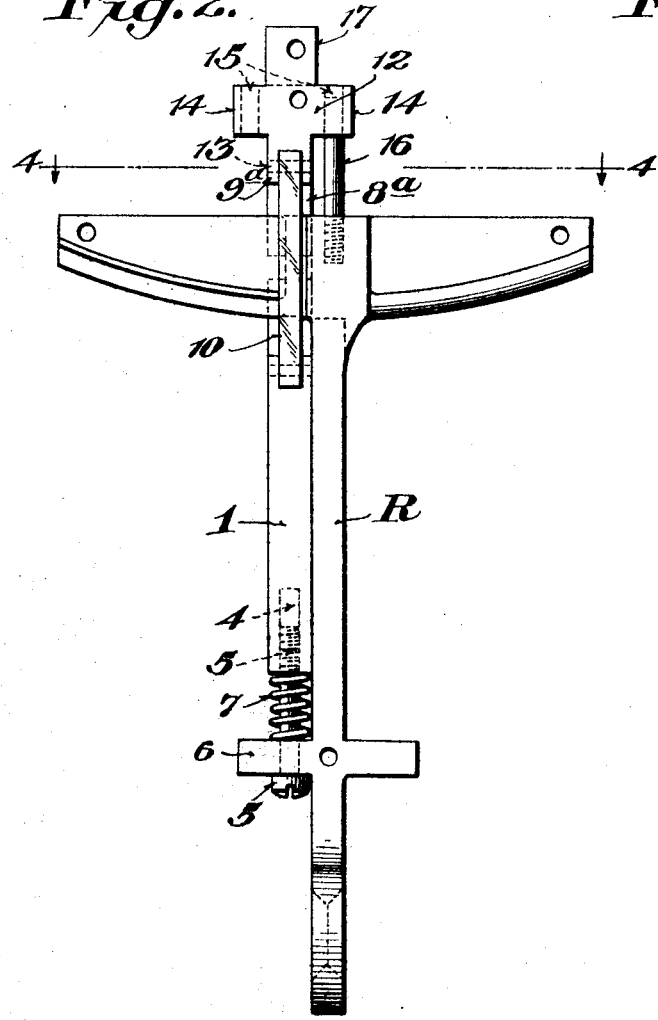
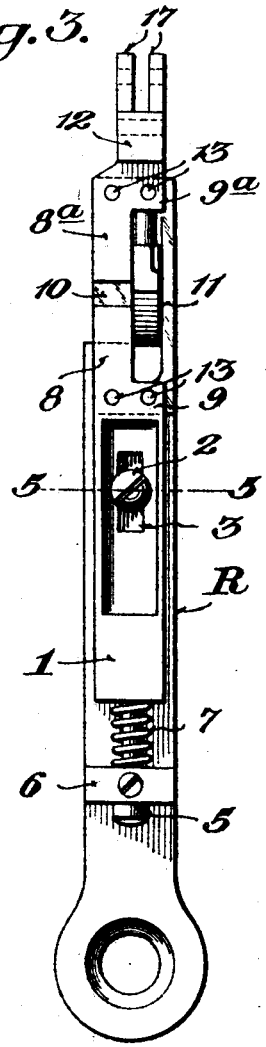
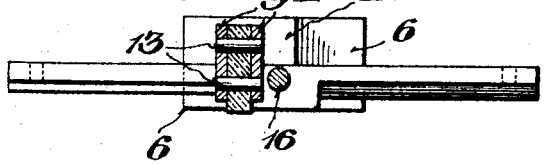
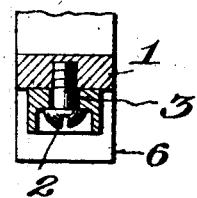
INVENTOR
Sylvester G. Averell,
BY Henry M. Bingham
ATTORNEY Patented Jan. 12, 1932

1,840,347

UNITED STATES PATENT OFFICE

SYLVESTER G. AVERELL, OF NEW YORK, N. Y., ASSIGNOR TO JOHN CHATILLON & SONS, OF NEW YORK, N. Y., A CORPORATION OF NEW YORK

SPRING SCALE

Application filed June 6, 1929. Serial No. 368,855.

This invention relates to spring scales, and more particularly to a novel construction of means for actuating the indicating mechanism and is mounted on the runner or beam of the scale and adapted to correct the zero reading of the indicator at all temperatures.

To that end the preferred form of the invention contemplates a mounting for the rack which includes a member having a higher co-efficient of expansion than the material of the main loading springs of the scale whereby under changing temperature conditions, the relative position of the rack with reference to the pinion on the indicator shaft will be automatically adjusted to correct the zero position of the indicator. In that connection, the present construction has a wide range of utility in spring scales of the type referred to and is primarily intended to be embodied in a scale which is also provided with means for the correction of the error in the scale reading due to changes in stiffness of the load carrying springs under changing temperature conditions, and which with my invention installed therein would cause the indicating mechanism to correctly and accurately indicate under all load and temperature conditions.

For example, the present type of construction may be used in connection with such a device as is described in the patent to B. F. Chatillon, No. 1,220,192, patented March 27, 1917, in which means are provided for compensating for the changes in stiffness of the load carrying springs due to changes in temperature.

Another object of the invention is to provide a construction which permits of the use of a metallic rack for engaging the pinion on the indicator shaft by placing the means for compensating for temperature changes in a member associated with the runner so that the said material will not be subjected to the strain and abrasive effect of the rack engagement with the pinion or at the point of support on the runner.

A further object of the invention is to provide a simple and practical structural arrangement for including the member or members of higher co-efficient of expansion than the material of the springs in the runner or beam upon which the rack is supported.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:—

Fig. 2 is an enlarged detail view of a runner having the present compensating rack support applied thereto.

Fig. 3 is a side elevation of the construction shown in Fig. 2.

Fig. 4 is a detail horizontal sectional view taken on the line 4—4 of Fig. 2.

Fig. 5 is also a cross-sectional view taken on the line 5—5 of Fig. 3.

Similar reference characters designate corresponding parts throughout the several figures of the drawings.

Figure 1:
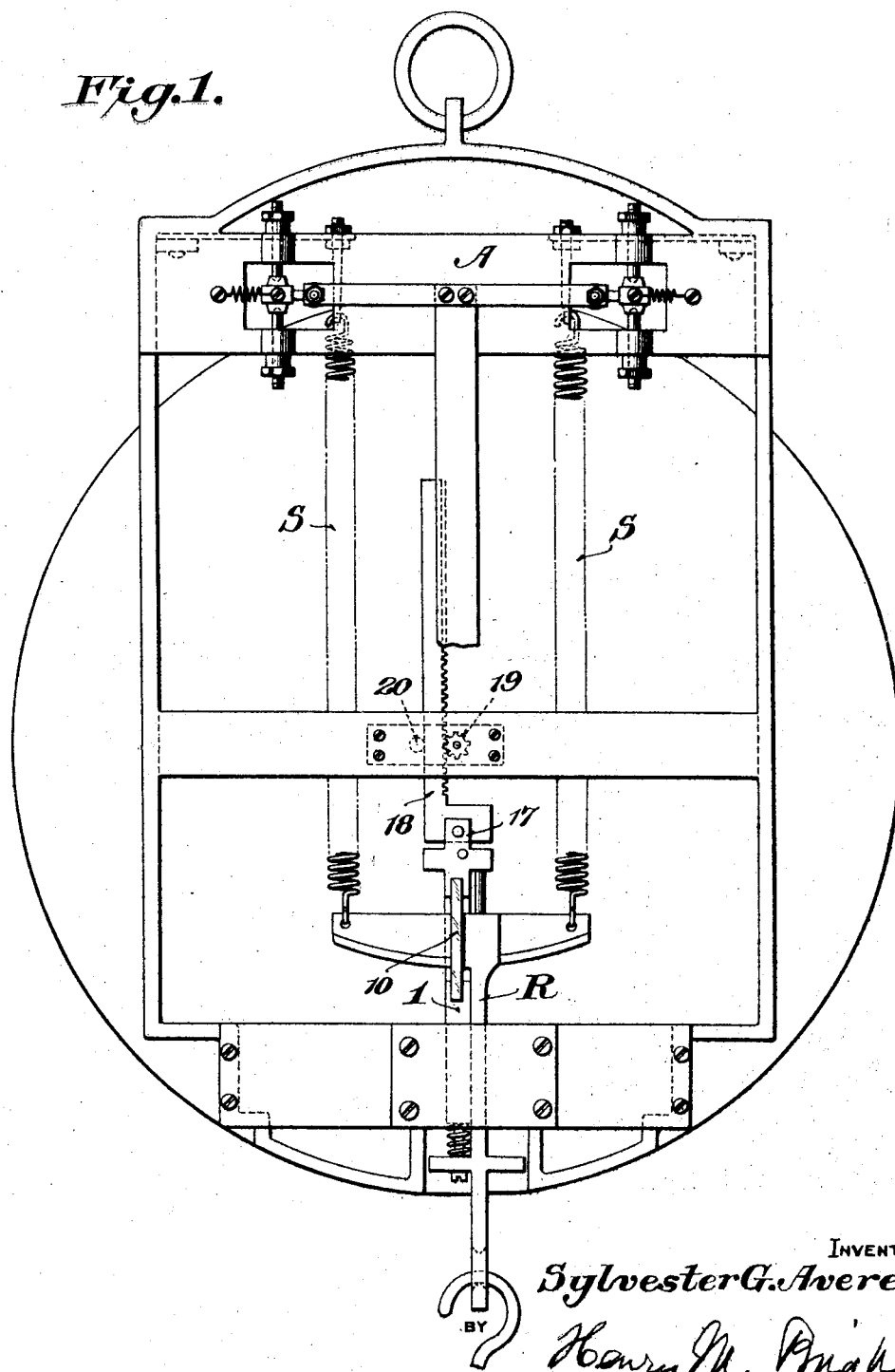
Figure 1 is a view of a scale mechanism embodying the present improvements, the casing of the scale being removed.

Since the means for correcting the error in the scale reading due to the changing stiffness of the main loading springs S are fully described in detail in the patent referred to, the same will not be described herein, but is designated generally by the reference A.

Referring more particularly to the improved features of the present construction, it will be observed that the beam or runner R which is carried by the lower ends of the main load responsive springs S, is provided with an adjustable rack carrier bar 1 which is slidably attached to one side of the shank of the runner by the screw 2 and guiding slot 3. The lower end of the carrier bar 1 is provided with a socket 4 for receiving an adjusting screw 5 which is mounted in one of the offset arms 6 of the runner. The shank of the screw 5 between the arm 6 and the end of the carrier bar is surrounded by a coil spring 7 which serves as means for preventing movement of the screw 5 in the socket 4 except by manual manipulation, and also yieldingly supports and spaces the lower end of the rack carrier bar 1 from the arm 6.

The upper end of the rack carrier bar 1 is formed with the offset bifurcated or slotted portions 8 and 9 and receives therein the compensating link or insert 10 which is provided with an opening 11, which enables the same to be fitted over the cross arm of the runner to which the lower ends of the load carrying springs are attached. The upper end of this insert fits into the bifurcated or slotted portions 8a and 9a of the rack carrying head 12 of the bar 1. As will be apparent from Fig. 3, the upper and lower ends of the insert 10 are respectively rigidly secured in the slotted portions 8 and 9 and 8a and 9a by suitable fastenings 13.

The said insert 10 is preferably made of a material having a higher co-efficient of expansion than the material of the springs S, an example of such material being celluloid or acetate sheet stock.

The head 12 of the rack carrier bar 1 is provided with one or more offset portions 14 having guiding openings 15 thereof, one of which for example is adapted to receive the guiding pin 16 carried by the upper end of the runner, thereby providing an arrangement which prevents canting or tilting of the head 12 as well as relieving the insert 10 of undue strain.

The upper end of the head 12 is formed with a slot 17 for pivotally receiving therein the lower end of the rack 18 which meshes with the pinion 19 on the dial shaft, the rack being maintained in positive contact with the pinion by the guide pin 20.

The co-efficient of expansion of the member 10 and its length is such that under changes in temperature, it will be longitudinally contracted or expanded to such an extent as to compensate for the elongation or contraction in the wire of the load springs and maintain the indicator at the zero point when the scale is under no load under all temperature changes.

From the foregoing it will be apparent that the present invention provides a construction for correcting the zero point which may be readily incorporated in any spring scale and is particularly adapted for use in spring scales for which means for correcting the dial reading for changes in the stiffness in the load carrying springs due to changes in temperature.

I claim:

1. In a spring scale the combination with indicating means including a pinion and a metallic rack, of a runner operatively connected with said rack, said connecting means comprising means composed of homogeneous material arranged between the runner and the rack below the point of engagement with the pinion for correcting the zero reading of the indicating means.

2. In a spring scale the combination with indicating means including a pinion and a metallic rack, of a runner operatively connected with said rack, said connecting means comprising an insert of homogeneous material arranged between the runner and the rack below the point of contact with the pinion, such means having such length and higher co-efficient of expansion than the loading spring of the scale as will cause the rack to maintain the indicating means at zero when the scale is under no load at all temperatures.

3. In a spring scale the combination with indicating means including a pinion and a metallic rack, of a runner operatively connected with said rack, said connecting means comprising an insert composed of homogeneous material arranged between the runner and the rack below the point of contact with the pinion, having such length and higher co-efficient of expansion than the material of the spring of the scale as will cause the rack to maintain the indicating means at zero when the scale is under no load at all temperatures.

4. In a spring scale the combination with indicating means and a runner, of a rack operatively connected with said indicating means, and a member composed of homogeneous material connecting the rack with the runner, said member being of such length and higher co-efficient of expansion than the material of the spring of the scale as will maintain the indicating means at zero when the scale is under no load at all temperatures.

5. In a spring scale the combination with indicating means and a runner, of a bar carried by the runner, a head for said bar, a rack connected to the head and operatively engaging the indicating means, and a member connecting said head and bar, said member being of a material having such a higher co-efficient of expansion than the material of the spring of the scale as will cause the rack to maintain the indicating means at zero when the scale is under no load at all temperatures.

6. In a spring scale the combination with indicating mechanism, of a runner, means for actuating the indicating mechanism mounted on the runner, such actuating means consisting of two sections secured together by a connecting member composed of homogeneous material of such length and having such a high co-efficient of expansion as will maintain the indicator at zero when the scale is under no load at all temperatures.

7. In a spring scale, the combination with an indicator, of a runner, means carried by the runner for operatively engaging the indicator, said means including an insert composed of homogeneous material of such length and having such a high co-efficient of expansion as will maintain the indicator at zero when the scale is under no load at all temperatures.

8. In a spring scale, the combination with an indicator and a runner, means for operatively connecting the runner with the indicator comprising a rack, a rack carrier bar, and an insert composed of homogeneous material embodied in said rack carrier bar of such length and having such a high co-efficient of expansion as will maintain the indicator at zero when the scale is under no load at all temperatures.

9. In a spring scale, the combination with an indicator and a runner, means for operatively connecting the runner with the indicator comprising a rack, a rack carrier bar adjustably mounted on the runner and including a body section and a head section, and an insert connecting the said sections, said insert material having such length and high co-efficient of expansion as will maintain the indicator at zero when the scale is under no load at all temperatures.

10. In a spring scale, the combination with an indicator and a runner, means for operatively connecting the runner with the indicator comprising a rack, a rack carrier bar including a body section and a head section, the former being adjustably mounted on the runner, means for guiding the head section, and an insert for connecting the head and body section of the carrier bar, said insert material having such a high co-efficient of expansion as will maintain the indicator at zero when the scale is under no load at all temperatures.

In testimony whereof I hereunto affix my signature.

SYLVESTER G. AVERELL.